(12) United States Patent
Kim et al.

(10) Patent No.: US 11,914,694 B2
(45) Date of Patent: *Feb. 27, 2024

(54) HUMAN ID FOR MOBILE AUTHENTICATION

(71) Applicant: Samsung Electronics Co., Ltd., Suwon-si (KR)

(72) Inventors: Kwang Oh Kim, Cerritos, CA (US); Yibing Michelle Wang, Temple City, CA (US); Kamil Bojanczyk, San Jose, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 4 days.

This patent is subject to a terminal disclaimer.

(21) Appl. No.: 17/669,353

(22) Filed: Feb. 10, 2022

(65) Prior Publication Data

US 2022/0164427 A1 May 26, 2022

Related U.S. Application Data

(63) Continuation of application No. 16/520,351, filed on Jul. 23, 2019, now Pat. No. 11,321,436.

(Continued)

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/34* (2013.01); *G06V 40/45* (2022.01); *G06V 40/70* (2022.01); *G10L 17/00* (2013.01)

(58) Field of Classification Search
CPC ......... G06F 21/32; G06F 21/34; G10L 17/00; G10L 17/26; G06K 9/00892; G06K 9/00906

See application file for complete search history.

(56) References Cited

U.S. PATENT DOCUMENTS 10,154,029 B1 12/2018 Griffin
10,984,083 B2 4/2021 Lesso et al.
(Continued)

FOREIGN PATENT DOCUMENTS

TW I631500 B 8/2018

OTHER PUBLICATIONS

Notice of Allowance for U.S. Appl. No. 16/520,351, dated Jan. 12, 2022.

(Continued)

*Primary Examiner* — Jeffrey C Pwu
*Assistant Examiner* — William A Corum, Jr.
(74) *Attorney, Agent, or Firm* — Renaissance IP Law Group LLP

(57) ABSTRACT

A computing device includes a system that authenticates a user of the computing device. A first sensor obtains a first representation of a physical characteristic of the user that is compared to a registered representation of the physical characteristic of the user. A first level of access to the computing device is enabled based on the first representation of the physical characteristic matching the second representation of the physical characteristic. A second sensor obtains a first representation of a liveness characteristic of the user that indicates that the user is alive. The first representation of the liveness characteristic is compared to a registered representation of the liveness characteristic of the user. A second level of access to the computing device is enabled based on the first representation of the liveness characteristic of the user matching the second representation of the liveness characteristic of the user.

13 Claims, 4 Drawing Sheets

Related U.S. Application Data

(60) Provisional application No. 62/841,825, filed on May 1, 2019.

(51) Int. Cl.
*G06F 21/34* (2013.01)
*G10L 17/00* (2013.01)
*G06V 40/40* (2022.01)
*G06V 40/70* (2022.01)

(56) References Cited

U.S. PATENT DOCUMENTS

| | | |
|---|---|---|
| 2011/0142234 A1 | 6/2011 | Rogers |
| 2012/0254963 A1 | 10/2012 | Sancheti et al. |
| 2014/0162598 A1 | 6/2014 | Villa-Real |
| 2015/0137938 A1 | 5/2015 | Slaby et al. |
| 2015/0242605 A1 | 8/2015 | Du et al. |
| 2015/0301796 A1 | 10/2015 | Visser et al. |
| 2016/0026884 A1* | 1/2016 | Ferren .................. G03B 3/00 382/118 |
| 2016/0063235 A1 | 3/2016 | Tussy |
| 2017/0169231 A1* | 6/2017 | Chhabra ............ G06F 21/577 |
| 2017/0220786 A1 | 8/2017 | Guo et al. |
| 2018/0211094 A1 | 7/2018 | Shadd |
| 2018/0239955 A1 | 8/2018 | Rodriguez et al. |
| 2018/0307303 A1 | 10/2018 | Powderly et al. |
| 2019/0013026 A1* | 1/2019 | Feng .................... G10L 25/51 |
| 2019/0034020 A1 | 1/2019 | He et al. |
| 2019/0087555 A1* | 3/2019 | Lee .................... G06V 40/70 |
| 2019/0278895 A1 | 9/2019 | Streit |
| 2019/0304472 A1 | 10/2019 | Pendyala et al. |
| 2019/0377963 A1 | 12/2019 | Hamid et al. |
| 2020/0097643 A1 | 3/2020 | Uzun et al. |
| 2020/0210561 A1 | 7/2020 | Fu et al. |
| 2021/0117529 A1 | 4/2021 | Martinez et al. |

OTHER PUBLICATIONS

Office Action for U.S. Appl. No. 16/520,351, dated Aug. 25, 2021.

* cited by examiner

HUMAN ID FOR MOBILE AUTHENTICATION

CROSS-REFERENCE TO RELATED APPLICATION

This application is a continuation of U.S. patent application Ser. No. 16/520,351 filed Jul. 23, 2019 which is incorporated by reference and which claims priority to, and the benefit of, U.S. Provisional Patent Application Ser. No. 62/841,825 filed on May 1, 2019, the disclosure of which is incorporated herein by reference in its entirety.

TECHNICAL FIELD

The subject matter disclosed herein relates to user authentication for a computing device. More specifically, the subject matter disclosed herein relates to a system and a method that provides user authentication for a computing device, such as a mobile device.

BACKGROUND

Traditional user authentication techniques for unlocking a mobile device have many technological and fraudulent-type challenges. For example, one security technique that provides a relatively low level of user intrusiveness is based on a three-dimensional (3D) depth sensor that is used to identify a user intending to gain access to a mobile device. Such a 3D-depth sensor when used in a mobile device may be a relatively expensive and physically large module. Additionally, a 3D-depth sensor does not check for liveness, i.e., the state of a user intending to gain access to a mobile device as being alive.

An in-display fingerprint sensor, which may also be used as part of an authentication technique and that generally involves a relative low-level of user intrusiveness, also has a generally low authentication success rate. Fingerprint sensors use a dedicated contact surface area and respond to physical contact by a user. Performance may suffer if the contact surface is not clean. An iris sensor, which may also be used as part of an authentication technique, may be prone to fraudulent authentication attacks, as are two-dimensional (2D) sensors.

SUMMARY

An example embodiment provides a method to authenticate a user of a computing device that may include: obtaining from a first sensor coupled to the computing device a first representation of a physical characteristic of the user; comparing by an authentication processor of the computing device the first representation of the physical characteristic of the user to a second representation of the physical characteristic of the user in which the second representation of the physical characteristic of the user may be obtained prior to the first representation of the physical characteristic of the user; enabling by the authentication processor a first level of access to the computing device based on the first representation of the physical characteristic of the user matching the second representation of the physical characteristic of the user; obtaining from a second sensor coupled to the computing device a first representation of a liveness characteristic of the user, the liveness characteristic indicating that the user is alive; comparing by the authentication processor the first representation of the liveness characteristic of the user to a second representation of the liveness characteristic of the user in which the second representation of the liveness characteristic of the user may be obtained prior to the first representation of the liveness characteristic of the user; and enabling by the authentication processor a second level of access to the computing device based on the first representation of the liveness characteristic of the user matching the second representation of the liveness characteristic of the user in which the second level of access to the computing device may be greater than the first level of access to the computing device.

In one example embodiment, the method may further include: obtaining from a third sensor coupled to the computing device a third representation of a liveness characteristic of the user; and comparing by the authentication processor the third representation of the liveness characteristic of the user to a fourth representation of the liveness characteristic of the user in which the fourth representation of the liveness characteristic of the user may be obtained prior to the third representation of the liveness characteristic of the user; and wherein enabling by the authentication processor the second level of access to the computing device may be further based on the third representation of the liveness characteristic of the user matching the fourth representation of the liveness characteristic of the user.

In another example embodiment, the method may further include: obtaining from a third sensor coupled to the computing device a third representation of a liveness characteristic of the user; and comparing by the authentication processor the third representation of the liveness characteristic of the user to a fourth representation of the liveness characteristic of the user in which the fourth representation of the liveness characteristic of the user may be obtained prior to the third representation of the liveness characteristic of the user, and wherein enabling by the authentication processor the second level of access to the computing device may be further based on the third representation of the liveness characteristic of the user matching the fourth representation of the liveness characteristic of the user.

In still another example embodiment, the method may further include: obtaining from a third sensor coupled to the computing device a third representation of a liveness characteristic of the user; and comparing by the authentication processor the third representation of the liveness characteristic of the user to a fourth representation of the liveness characteristic of the user in which the fourth representation of the liveness characteristic of the user may be obtained prior to the third representation of the liveness characteristic of the user, and wherein enabling by the authentication processor the second level of access to the computing device may be further based on the third representation of the liveness characteristic of the user matching the fourth representation of the liveness characteristic of the user.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
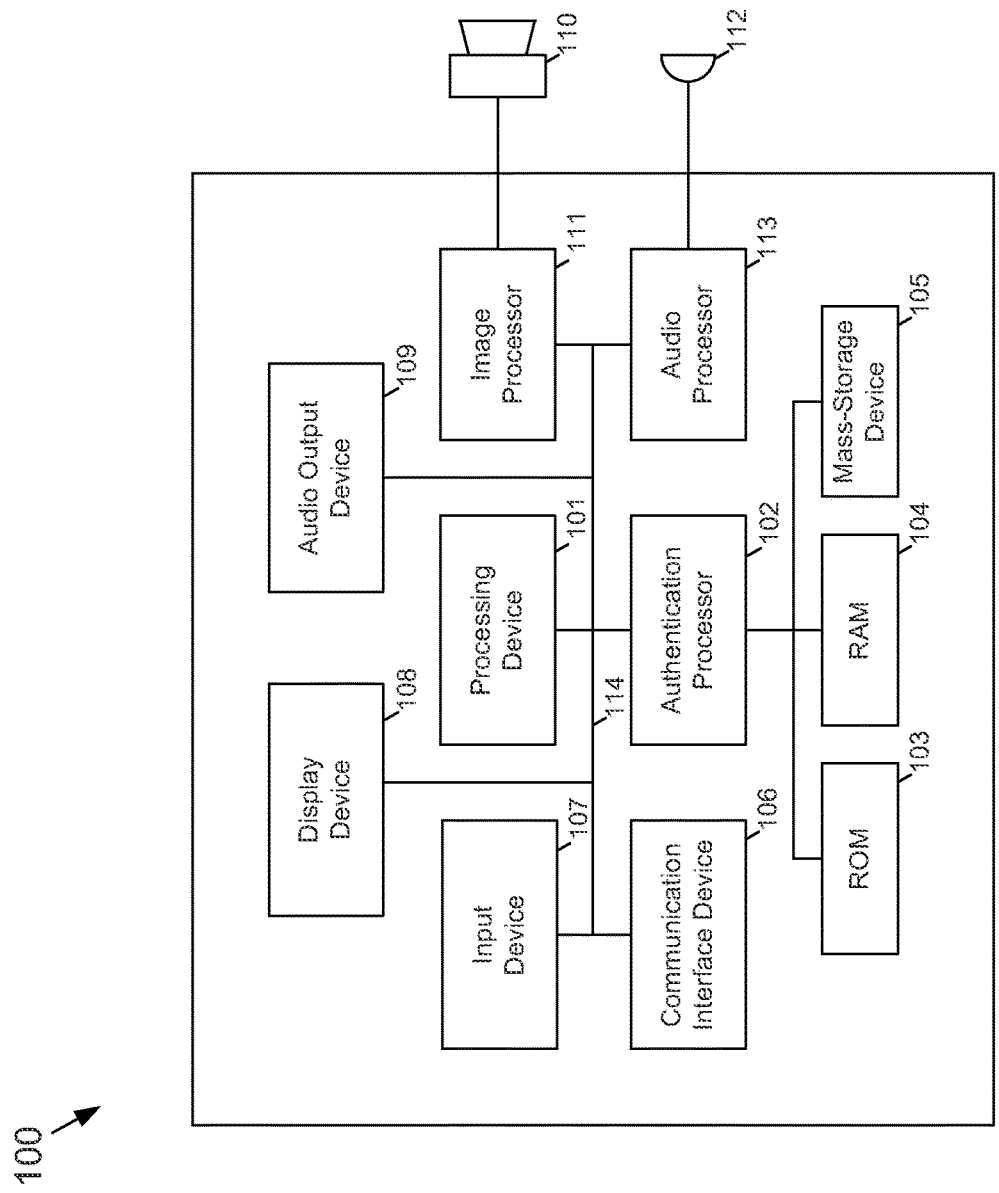
FIG. 1 depicts a functional block diagram of an example embodiment of a computing device that provides user authentication functionality according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

The subject matter disclosed herein provides a reliable and a relatively high level of authentication security for computing devices, such as, but not limited to, mobile devices. The subject matter disclosed herein also provides a system and a technique to authenticate a user of computing device that uses existing sensors, such as a two-dimensional (2D) camera, a three-dimensional (3D) camera and/or an audio-input device (i.e., a microphone).

FIG. 1 depicts a functional block diagram of an example embodiment of a computing device 100 that provides user authentication functionality according to the subject matter disclosed herein. The computing device 100 may be implemented as, but is not limited to, a computer, a personal computer, a handheld processing device, a mobile telephone, and a smartphone. The computing device 100 may include a processing device 101, an authentication processor 102, read-only memory (ROM) 103, random access memory (RAM) 104, mass-storage memory 105, a communication interface/device 106, an input device 107, a display device 108, an audio-output device 109, one or more camera devices 110, an image processor 111, one or more audio-input devices 112, and an audio processor 113.

The various components of the computing device 100 may be interconnected by one or more buses 114, which may include control/address buses and data buses. Additionally, the one or more of the various components of the computing device 100 may respectively be implemented as one or modules that may be any combination of software, firmware and/or hardware configured to provide the functionality described herein in connection with the component. The modules may, collectively or individually, be embodied as circuitry that forms part of a larger system, for example, but not limited to, an integrated circuit (IC), system on-chip (SoC) and so forth.

In one embodiment, the processing device 101 may be a microprocessor that executes program instructions that may be stored in the ROM 103, the RAM 104 and/or the mass-storage device 105. In one embodiment, the mass-storage device 105 may be a non-volatile memory device, such as, but not limited to, a solid-state drive (SSD). The communication interface device 106 may connected the computing device 100 to one or more external wired or wireless networks (not shown). In one embodiment, the input device 107 may be a keyboard, a mouse or other similar input device. In one embodiment, the display device 108 may be a touchscreen display.

The authentication processor 102 may provide user authentication functionality as described herein based on inputs received from one or more camera devices 110 and/or one or more audio-input devices 112. In one embodiment, the authentication processor 102 may be a module that is part of the processing device 101 or that may be separate from the processing device 101. In one embodiment, the camera device 110 may be, but is not limited to, a forward-facing 2D camera of a smartphone, and the audio-input device 112 may be a microphone. In another embodiment, the camera device 110 may include a 3D camera that provides 3D depth technology based on, for example, structured lighting, time-of-flight, stereo imagery or other 3D-depth estimating technique. The image processor 111 may receive images captured, or recorded, by the camera 110 and perform image processing on the captured images. The audio processor 113 may receive audio signals captured, or recorded, by the audio-input device 112 and perform audio processing on the captured audio signals.

Figure 2:
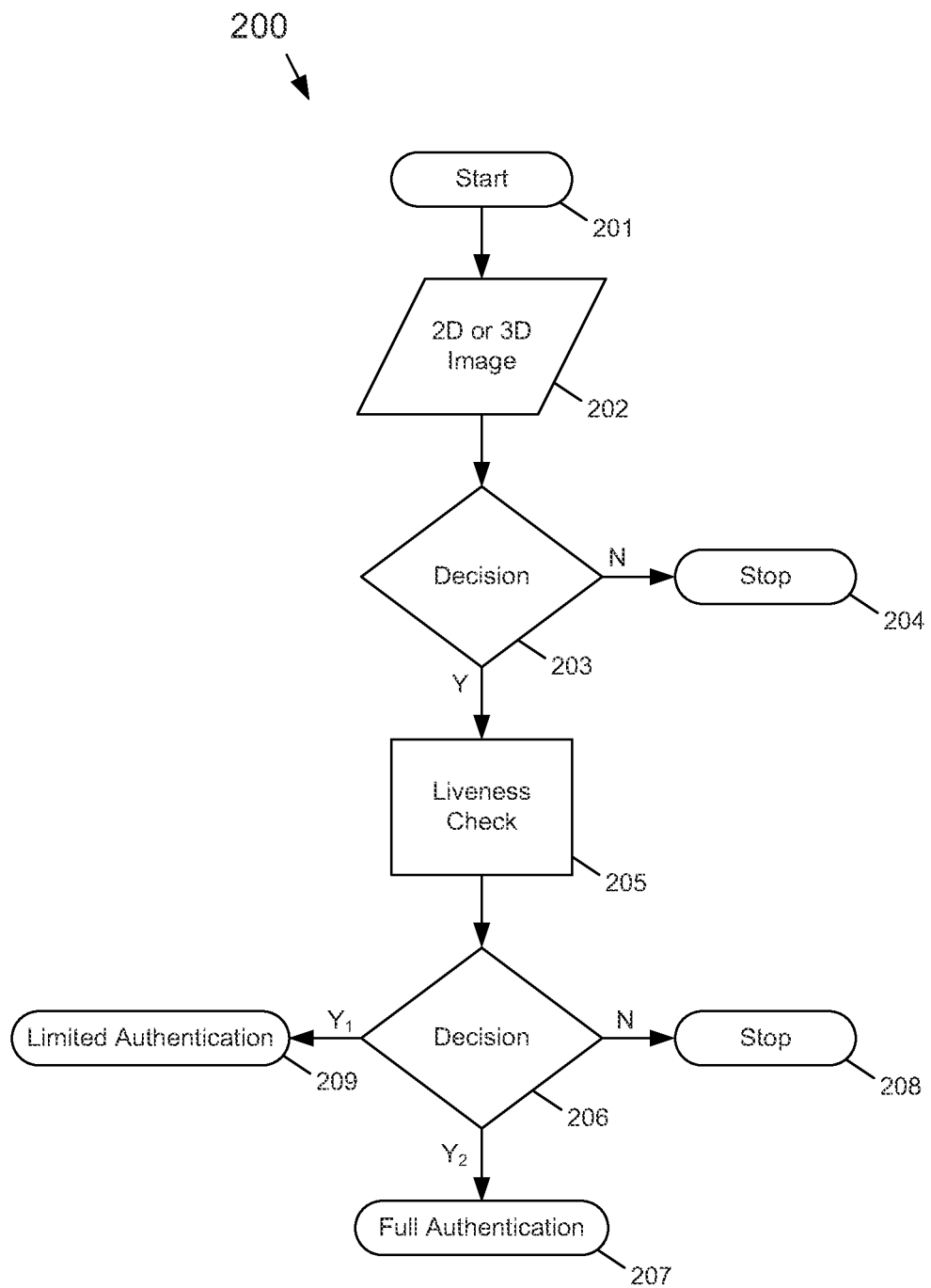
FIG. 2 is a flow diagram of a first example embodiment of a method to authenticate a user of a computing device according to the subject matter disclosed herein.

FIG. 2 is a flow diagram of a first example embodiment of a method 200 to authenticate a user of a computing device according to the subject matter disclosed herein. The process starts at 201. At 202, an image of a body part of the user, such as the face or a hand of the user, may be captured, or recorded, by the camera device 110. The image processor 111 may provide processing of the captured image, such as, but not limited to 2D processing, 3D processing, edge enhancement, and/or color processing.

At 203, the authentication processor 102 may determine whether the captured image matches a previously captured image of the same body part of the user. Edge information of, for example, the user's face or hand may be extracted from an image captured by the camera device 110 for authentication purposes. The extracted edge information may be compared to another image of the same body part of the user that has been previously captured and registered as part of, for example, an authentication setup process. In one embodiment, the image processor 111 may extract edge information from both the captured image and the registered image that may be used by the authentication processor 102. If, for example, the edges of a captured face image and a preregistered face image match, the authentication processor 102 may generate a first authentication signal that may be used to unlock the computing device 100 corresponding to a first level of authentication. Other image and body characteristics may be used for authentication, such as, but not limited to, depth of facial or body features, distance ratios of eye-center-to-eye-center distance to another facial point, inter-finger finger length ratios, and ratios for a tip-of-nose-to-center-of-eye distances. If, at 203, the image comparison fails, flow continues to 204 where the authentication process stops.

If, at 203, the image comparison passes, the user authentication process may be considered to have authenticated the user to a first level of authentication in which only a selected portion of the computing device 101 may be made accessible to the user. If the image comparison passes at 203, flow continues to 205 where a liveness check may be conducted to authenticate the user to a higher level of authentication.

In one embodiment, during the liveness check at 205 one or more gestures and/or movements, such as, but not limited to, a facial expression, an eye blink, hand movement or finger movement, may be captured by the camera device 110 (and image processor 111). The authentication processor 102 may determine whether the user is alive based on captured body one or more gestures and/or one or more movements match previously registered gesture(s) and/or motion(s). Additionally or alternatively, other gestures may include, but are not limited to, closing one or both eyes, smiling, frowning, moving hands, crossing fingers, and/or some other body-motion pattern may be used. In one embodiment, the gestures and/or movements may be a combination of gestures and/or movements.

If, at 206, the authentication processor 102 determines that the one or more captured gestures and/or movements match the registered gesture(s) and/or movement(s), flow may continue to 207 where the authentication processor 102 may generate a second authentication signal that may be used to unlock the computing device 100 corresponding to a second level of authentication based on the user being fully authenticated, and full access to the computing device 100 may be provided. If, at 206, the captured gesture(s) and/or movement(s) do not match the registered gesture(s) and/or movement(s), flow continues to 208 where the authentication process stops and the lower level of authentication attained at 203 and corresponding level of access to the computing device are maintained.

In an alternative embodiment, the gesture(s) and/or movement(s) captured may match specific registered gesture(s) and/or movement(s) that correspond to a level of authentication that may be between the level of authentication provided by passing the authentication test at 203 and the full level of authentication provided at 207. That is, there may be several sets of registered gesture(s) and/or movement(s) in which each respective set corresponds to a particular level of authentication. In still another alternative embodiment, the gesture(s) and/or movement(s) captured may match registered gestures or movements that cause the authentication processor 102 to completely lock the computing device 100 until a predetermined condition occurs, such as, but not limited to, a special password, gesture, or spoken word.

In another embodiment, the liveness check at 205 may alternatively or additionally include capturing, or recording, the voice of the user by the audio-input device 112 and the audio processor 113, and comparing the recorded voice against a previously registered voice recording of the user. Additionally or alternatively, an interactive conversation may take place at 205 between the computing device 101 and the user using via the audio-output device 109 in which the user may answer a series of questions or speak a series of words in response to prompting cues output from the audio-output device 109.

In still another embodiment, sensors of the authentication processor 102 may detect an emotion of the user and may determine whether the user is being forced to unlock the computing device under duress. For example, a level of stress of the user that may be contained in a captured audio recording during authentication may be detected by affective processing or computing as being greater than a level of stress of the user contained in a corresponding registered recording. Vocal parameters and prosodic features, such as pitch variables and speech rate may be analyzed through pattern recognition techniques. Additional or alternative indications of an emotion or level of stress may include, but are not limited to, tone of voice, facial expressions and pressure from a finger. Upon detection of an increased level of stress, flow may be from 206 to 208 or 209.

In another embodiment, a secondary pattern of body motion(s) and/or voice capture(s) may be used to unlock the mobile device, and in so doing selectively hide information from a user. In still another embodiment, the authentication technique disclosed herein may be used to permit a user to log in to selected accounts and/or services through the computing device.

Figure 3:
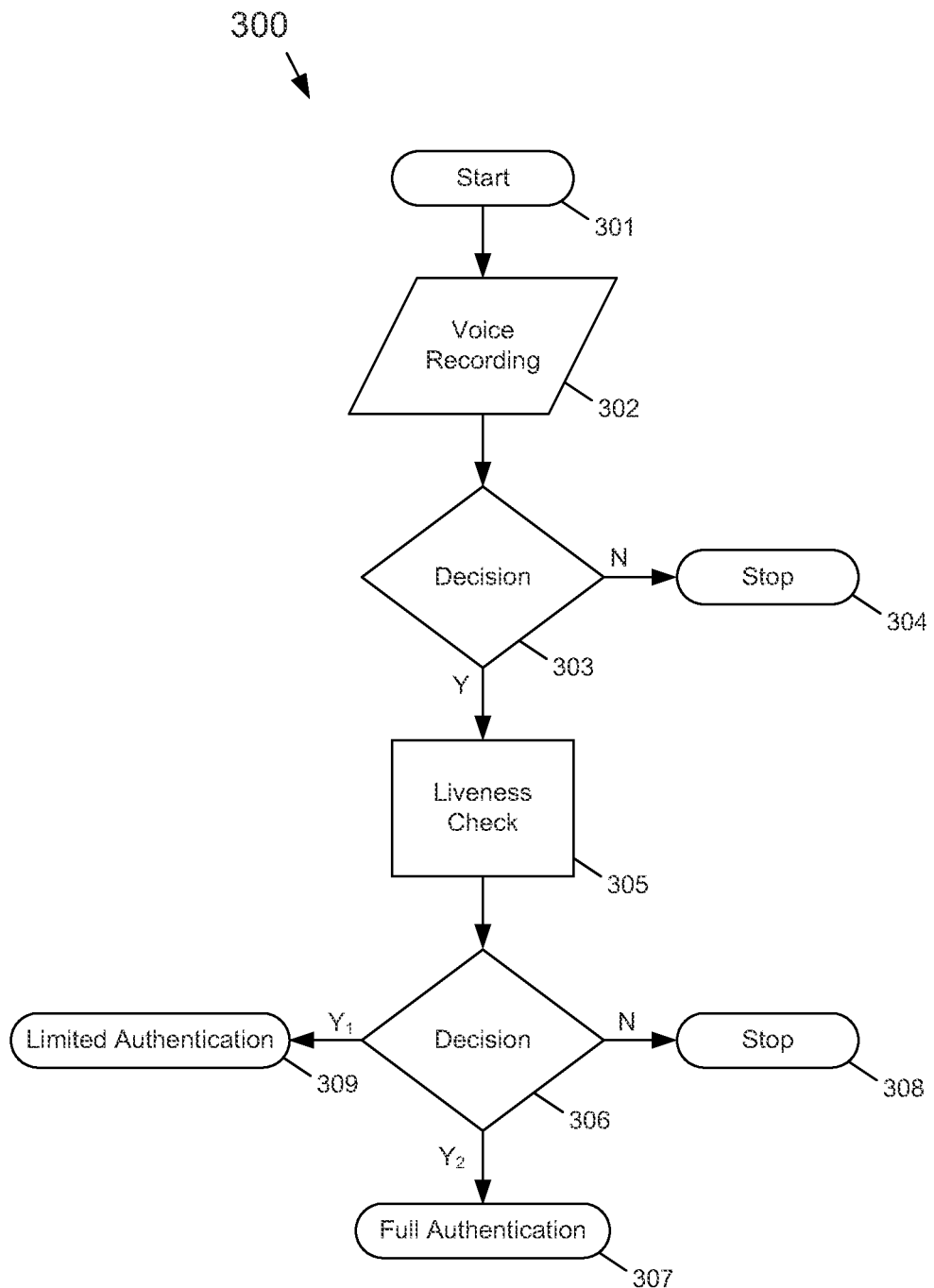
FIG. 3 is a flow diagram of a second example embodiment of a method to authenticate a user of a computing device according to the subject matter disclosed herein.

FIG. 3 is a flow diagram of a second example embodiment of a method 300 to authenticate a user of a computing device according to the subject matter disclosed herein. The process starts at 301. At 302, the voice of a user may be captured, or recorded, by the audio-input device 112. In one embodiment, the audio processor 113 may provide processing of the captured audio, such as, but not limited to noise reduction.

At 303, the authentication processor 102 may determine whether the captured audio matches a previously captured audio recording of the user. If the audio captured to user authentication and the previously registered audio recording match, the authentication processor 102 may generate a first authentication signal that may be used to unlock the computing device 100 corresponding to a first level of authentication. If, at 303, the audio comparison fails, flow continues to 304 where the authentication process stops.

If, at 303, the audio comparison passes, the user authentication process may be considered to have authenticated the user to a first level of authentication in which only a selected portion of the computing device 101 may be made accessible to the user. If the image comparison passes at 303, flow continues to 305 where a liveness check may be conducted to authenticate the user to a higher level of authentication.

In one embodiment, during the liveness check at 305 one or more gestures and/or movements, such as, but not limited to, a facial expression, an eye blink, hand movement or finger movement, may be captured by the camera device 110 and image processor 111. The authentication processor 102 may determine whether the user is alive based on captured body one or more gestures and/or one or more movements match previously registered gesture(s) and/or motion(s). Additionally or alternatively, other gestures may include, but are not limited to, closing one or both eyes, smiling, frowning, moving hands, crossing fingers, and/or some other body motion pattern may be used. In one embodiment, the gesture(s) and/or movement(s) may be a combination of gesture(s) and/or movement(s).

If, at 306, the authentication processor 102 determines that the one or more captured gesture(s) and/or movement(s) match the registered gesture(s) or movement(s), flow may continue to 307 where the authentication processor 102 may generate a second authentication signal that may be used to unlock the computing device 100 corresponding to a second level of authentication that is based on the user has been fully authenticated, and full access to the computing device 100 may be provides. If, at 306, the captured gesture(s) and/or movement(s) do not match the registered gesture(s) and/or movement(s), flow continues to 308 where the authentication process stops and the lower level of authentication and corresponding access to the computing device are maintained.

In an alternative embodiment, the gesture(s) and/or movement(s) captured may match particular registered gesture(s) and/or movement(s) that correspond to a level of authentication that may be between the level of authentication provided by passing the authentication test at 303 and the full level of authentication provided at 307. That is, there may be several sets of registered gesture(s) and/or movement(s) in which each respective set corresponds to a particular level of authentication. In still another alternative embodiment, the gesture(s) and/or movement(s) captured may match registered gesture(s) and/or movement(s) that cause the authentication processor 102 to completely lock the computing device 100 until a predetermined condition occurs, such as, but not limited to, a special password, gesture, or spoken word.

In another embodiment, the liveness check at 305 may alternatively or additionally include capturing, or recording, the voice of the user by the audio-input device 112 and the audio processor 113, and comparing the recorded voice against a previously registered voice recording of the user. Additionally or alternatively, an interactive conversation may take place at 305 between the computing device 101 and the user using via the audio-output device 109 in which the user may answer a series of questions or speak a series of words in response to prompting cues output from the audio-output device 109.

In still another embodiment, sensors of the authentication processor 102 may detect an emotion of the user and may determine whether the user is being forced to unlock the computing device under duress. For example, a level of stress of the user that may be contained in a captured audio recording may be detected as being greater than a level of stress of the user contained in a corresponding registered recording. Upon detection of an increased level of stress, flow may be from 306 to 308 or 309.

In another embodiment, a secondary pattern of body motion(s) and/or voice capture(s) may be used to unlock the mobile device, and in so doing selectively hide information from a user. In another embodiment, the authentication technique disclosed herein may be used to permit a user to log in to selected accounts and/or services through the computing device.

Figure 4:
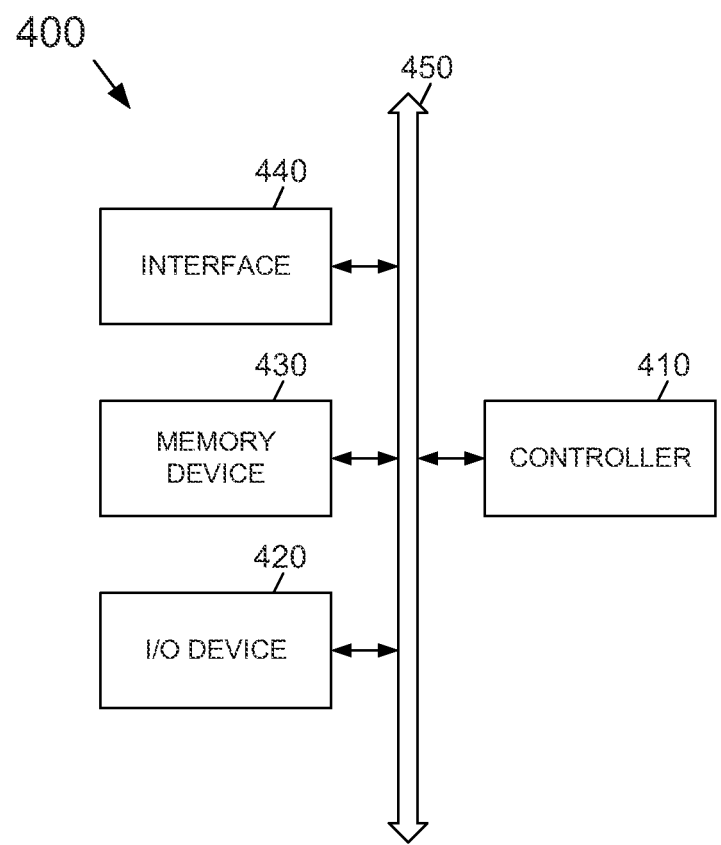
FIG. 4 depicts an electronic device that provides user authentication functionality according to the subject matter disclosed herein.

FIG. 4 depicts an electronic device 400 that provides user authentication functionality according to the subject matter disclosed herein. Electronic device 400 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 400 may include a controller 410, an input/output device 420 such as, but not limited to, a keypad, a keyboard, a display, a touch-screen display, a camera, and/or an image sensor, a memory 430, and an interface 440 that are coupled to each other through a bus 450. The controller 410 may include, for example, at least one microprocessor, at least one digital signal process, at least one microcontroller, or the like. The memory 430 may be configured to store a command code to be used by the controller 410 or a user data. Electronic device 400 and the various system components of electronic device 400 may form a system that provides user authentication functionality according to the subject matter disclosed herein. The interface 440 may be configured to include a wireless interface that is configured to transmit data to or receive data from a wireless communication network using a RF signal. The wireless interface 440 may include, for example, an antenna, a wireless transceiver and so on. The electronic system 400 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices).

The operations described in this specification may be implemented as operations performed by a data-processing apparatus on data stored on one or more computer-readable storage devices or received from other sources.

The term "data-processing apparatus" encompasses all kinds of apparatus, devices and machines for processing data, including by way of example, a programmable processor, a computer, a system on a chip, or multiple ones, or combinations, of the foregoing The apparatus may include special-purpose logic circuitry, e.g., an FPGA (field programmable gate array) or an ASIC (application-specific integrated circuit). The apparatus may also include, in addition to hardware, code that creates an execution environment for the computer program, e.g., code that constitutes processor firmware, a protocol stack, a database-management system, an operating system, a cross-platform runtime environment, a virtual machine, or a combination thereof. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus can also be implemented as, special-purpose logic circuitry, e.g., an FPGA (field programmable gate array) or an ASIC (application-specific integrated circuit).

Processors suitable for the execution of a computer program include, by way of example, both general-purpose and special-purpose microprocessors, and any one or more processors of any kind of digital computer. Generally, a processor may receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. A computer, however, need not have such devices. Moreover, a computer may be embedded in another device, e.g., a mobile telephone, a personal-digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special-purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, with which the user can provide input to the computer. Other kinds of devices can be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back-end component, e.g., as a data server, or that includes a middleware component, e.g., an application server, or that includes a front-end component, e.g., a user computer having a graphical user interface or a Web browser through which a user may interact with an implementation of the subject matter described in this specification, or any combination of one or more such back-end, middleware, or front-end components. The components of the system may be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system may include users and servers. A user and a server are generally remote from each other and typically interact through a communication network. The relationship of user and server arises by virtue of computer programs running on the respective computers and having a user-server relationship to each other.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A method to authenticate a user of a computing device, the method comprising:
   presenting a plurality of audible cues to the user through an audio output device of the computing device;
   requiring, by the computing device, the user to orally respond to the plurality of cues in an interactive manner;
   obtaining from a first sensor coupled to the computing device a first representation of a liveness characteristic of the user, wherein the first representation is an audio representation of the interactive oral responses of the user to the plurality of audible cues indicating that the user is alive and wherein the first sensor comprises an audio input device that captures the audio representation;
   comparing by an authentication processor of the computing device the first representation of the liveness characteristic of the user to a second representation of the liveness characteristic of the user, the second representation of the liveness characteristic of the user comprising at least a portion of a dialog spoken by the user that was obtained prior to the first representation of the liveness characteristic of the user;
   determining by the authentication processor whether a level of stress of the user contained in the first representation of the liveness characteristic of the user is greater than a level of stress of the user contained in the second representation of the liveness characteristic of the user; and
   disabling by the authentication processor a first predetermined level of access to the computing device based on the level of stress of the user contained in the first representation of the liveness characteristic of the user being an increased level of stress compared to the second representation of the liveness characteristic of the user.

2. The method of claim 1, further comprising enabling by the authentication processor the first predetermined level of access to the computing device based on the level of stress of the user contained in the first representation of the liveness characteristic of the user being less than a level of stress contained in the second representation of the liveness characteristic of the user.

3. The method of claim 1, further comprising enabling by the authentication processor the first predetermined level of access to the computing device based on the level of stress of the user contained in the first representation of the liveness characteristic of the user being a same level of stress contained in the second representation of the liveness characteristic of the user.

4. The method of claim 1, further comprising:
obtaining from a second sensor coupled to the computing device a first representation of a physical characteristic of the user;
comparing by the authentication processor the first representation of the physical characteristic of the user to a second representation of the physical characteristic of the user, the second representation of the physical characteristic of the user being obtained prior to the first representation of the physical characteristic of the user; and
enabling by the authentication processor a second predetermined level of access to the computing device based on the first representation of the physical characteristic of the user matching the second representation of the physical characteristic of the user and based on the level of stress of the user contained in the first representation of the liveness characteristic of the user being a same level of stress compared to the second representation of the liveness characteristic of the user, the second predetermined level of access to the computing device being less than or equal to the first predetermined level of access to the computing device.

5. The method of claim 4, wherein the second sensor comprises a camera device that captures images of the user, and
wherein the first and the second representations of the physical characteristic of the user comprise images of at least part of the user.

6. The method of claim 4, wherein the first sensor comprises a three-dimensional (3D) camera device, and
wherein the first and the second representations of the physical characteristic of the user comprise 3D images of at least part of the user.

7. The method of claim 4, wherein the second sensor comprises a three-dimensional (3D) camera device, and
wherein enabling by the authentication processor the second predetermined level of access to the computing device is further based on the first representation of the physical characteristic of the user matching depth of body features contained in the second representation of the physical characteristic of the user.

8. The method of claim 4, wherein the second sensor comprises a three-dimensional (3D) camera device.

9. The method of claim 4, further comprising:
obtaining from a third sensor coupled to the computing device a third representation of a liveness characteristic of the user; and
comparing by the authentication processor the third representation of the liveness characteristic of the user to a fourth representation of the liveness characteristic of the user, the fourth representation of the liveness characteristic of the user being obtained prior to the third representation of the liveness characteristic of the user, and
enabling by the authentication processor the second predetermined level of access to the computing device based on the third representation of the liveness characteristic of the user matching the fourth representation of the liveness characteristic of the user and based on the first representation of the physical characteristic of the user matching the second representation of the physical characteristic of the user.

10. The method of claim 9, wherein the third sensor comprises the first sensor, and
wherein the first and fourth representations of the liveness characteristic of the user comprise audio recordings of the user.

11. The method of claim 10, wherein the third sensor comprises the second sensor, and
wherein the third and fourth representations of the liveness characteristic of the user comprise images of a first movement of at least part of the user.

12. The method of claim 10, wherein the third sensor comprises the first sensor, and
wherein the third and fourth representations of the liveness characteristic of the user comprise audio recordings of the user.

13. The method of claim 10, wherein the third sensor comprises a camera device that captures images of the user, and
wherein the third and fourth representations of the liveness characteristic of the user comprise images of a first movement of at least part of the user.

* * * * *